United States Patent [19]

Scudder et al.

[11] Patent Number: 5,673,752

[45] Date of Patent: Oct. 7, 1997

[54] METHOD AND APPARATUS FOR PRODUCING GAS FROM A FORMATION CONTAINING BOTH GAS AND WATER

[76] Inventors: Pat Scudder, Rte. 1, Box 268, Dewey, Okla. 74029; George McCourt, P.O. Box 1083, Bartlesville, Okla. 74005

[21] Appl. No.: 577,195

[22] Filed: Dec. 22, 1995

[51] Int. Cl.⁶ .................. E21B 43/38; E21B 43/08
[52] U.S. Cl. .............. 166/265; 166/230; 166/231; 166/369
[58] Field of Search ............ 166/105.5, 227, 166/230, 231, 265, 369, 370; 210/747, 499

[56] References Cited

U.S. PATENT DOCUMENTS

| | | | |
|---|---|---|---|
| 1,731,366 | 10/1929 | Windsor . | |
| 2,035,758 | 3/1936 | Pierce | 210/169 |
| 2,217,370 | 10/1940 | Johnston . | |
| 2,640,545 | 6/1953 | Share . | |
| 2,877,852 | 3/1959 | Bashara | 166/236 |
| 3,099,318 | 7/1963 | Miller et al. | 166/227 |
| 4,171,017 | 10/1979 | Klass | 166/266 |
| 4,241,787 | 12/1980 | Price | 166/105 |
| 4,296,810 | 10/1981 | Price | 166/265 |
| 4,531,584 | 7/1985 | Ward | 166/265 |
| 4,766,957 | 8/1988 | McIntyre | 166/265 |
| 4,767,426 | 8/1988 | Daly et al. | 55/487 |
| 4,957,522 | 9/1990 | Brassell | 55/316 |
| 5,147,561 | 9/1992 | Burge et al. | 166/265 X |
| 5,309,998 | 5/1994 | Rivas et al. | 166/265 |
| 5,322,388 | 6/1994 | Wells | 166/265 X |
| 5,425,416 | 6/1995 | Hammeke et al. | 166/105.5 |

*Primary Examiner*—George A. Suchfield
*Attorney, Agent, or Firm*—Head Johnson & Kachigian

[57] ABSTRACT

Gas is separated from well fluid solutions by a hydrophobic membrane GORTEX® like filter element that is permeable to gas but impermeable to water; the filter element, which may include a solids prefilter, is positioned within the well bore containing water or well fluids at a depth where the hydrostatic pressure will allow the gas to bubble out of solution.

12 Claims, 3 Drawing Sheets

METHOD AND APPARATUS FOR PRODUCING GAS FROM A FORMATION CONTAINING BOTH GAS AND WATER

FIELD OF THE INVENTION

This invention relates to gas well production and, in particular, to a method and apparatus for separating water from the gas below the surface of the ground so that only gas is produced at the surface with the water being separated and retained within the well bore to create hydrostatic pressure that is used in assisting the separation and gas production process.

DESCRIPTION OF THE PRIOR ART

It is not at all uncommon in gas wells for the formation to include gas in solution with undesirable quantities of water. A typical gas production well, because of there being relative large quantities of water being produced along with the valuable gas product, requires extensive separation processes at the surface to dispose of the water. This usually requires separate disposal wells containing strata which will take the water. These processes are relatively expensive, especially in relatively low gas producing wells where it becomes exorbitant to even produce the well, because the cost of separation overrides the price of the gas. As a result, many relatively low production gas wells are plugged or abandoned, yet there is considerable unrecoverable gas reserves lost.

Oil and gas filters and screens for separating solid materials are described in the following U.S. Pat Nos.: 1,731,366; 2,640,545; 2,035,758; 3,099,318 and 2,877,852.

The concept of separating water from oil downhole within the well has been shown in U.S. Pat. No. 4,241,787 which requires a separate downhole disposal formation in the same well.

Because the water produced from deep formations within the earth frequently contain large amounts of natural salts, for environmental reasons, the produced salt water cannot be disposed of by allowing it to flow into surface drains or waterways. Although relative small amounts of salt water can be disposed of by drainage into a slush pit or an evaporation tank, the required disposal method for large volumes of salt water is to introduce it into subsurface formations in separate disposal wells where no damage can result. In many cases, the water is used as secondary recovery techniques, especially in oil production methods.

The use of membrane filters to separate water from gas has been taught in geothermal above ground production systems. This is shown in patents such as U.S. Pat. No. 4,171,017.

The concept of using membrane filters where the material is permeable to gas but impermeable to liquids, i.e. GORTEX®, has been shown to be commonly used in application such as sportswear wherein rain water is prevented from passage but the cloth is free to permit water vapor to pass therethrough. See U.S. Pat. No. 3,953,566. Other patents teaching the use of such materials will be found in the following U.S. Pat. Nos.: 4,957,522 and 4,767,426.

SUMMARY OF THE INVENTION

The principle object of the present invention is the provision of method and apparatus for separating gas and water within a well bore for producing substantially water free gas at the surface.

Another object of the invention is to provide a gas well producing method in which the producing formation water or brine is utilized to create and maintain a hydrostatic pressure within the well wherein at a given downhole elevation, the gas that is in solution bubbles out. At that elevation the apparatus of this invention comprising a prefilter and a membrane filter is positioned. A prefilter may be utilized to separate any solid materials, while the membrane filter is designed to separate the gas from the water. The membrane filter is permeable to gas but is impermeable to the water or brine.

A yet further object of the invention is to provide an improved downhole filter/separator which will effectively separate water from the gas in the well bore whereby the water need not be lifted to the surface to be separated.

The foregoing and other related objects and advantages of the present invention will become more apparent from the following specification, claims and appended drawings.

DETAILED DESCRIPTION OF THE PREFERRED EMBODIMENT

Figure 1:
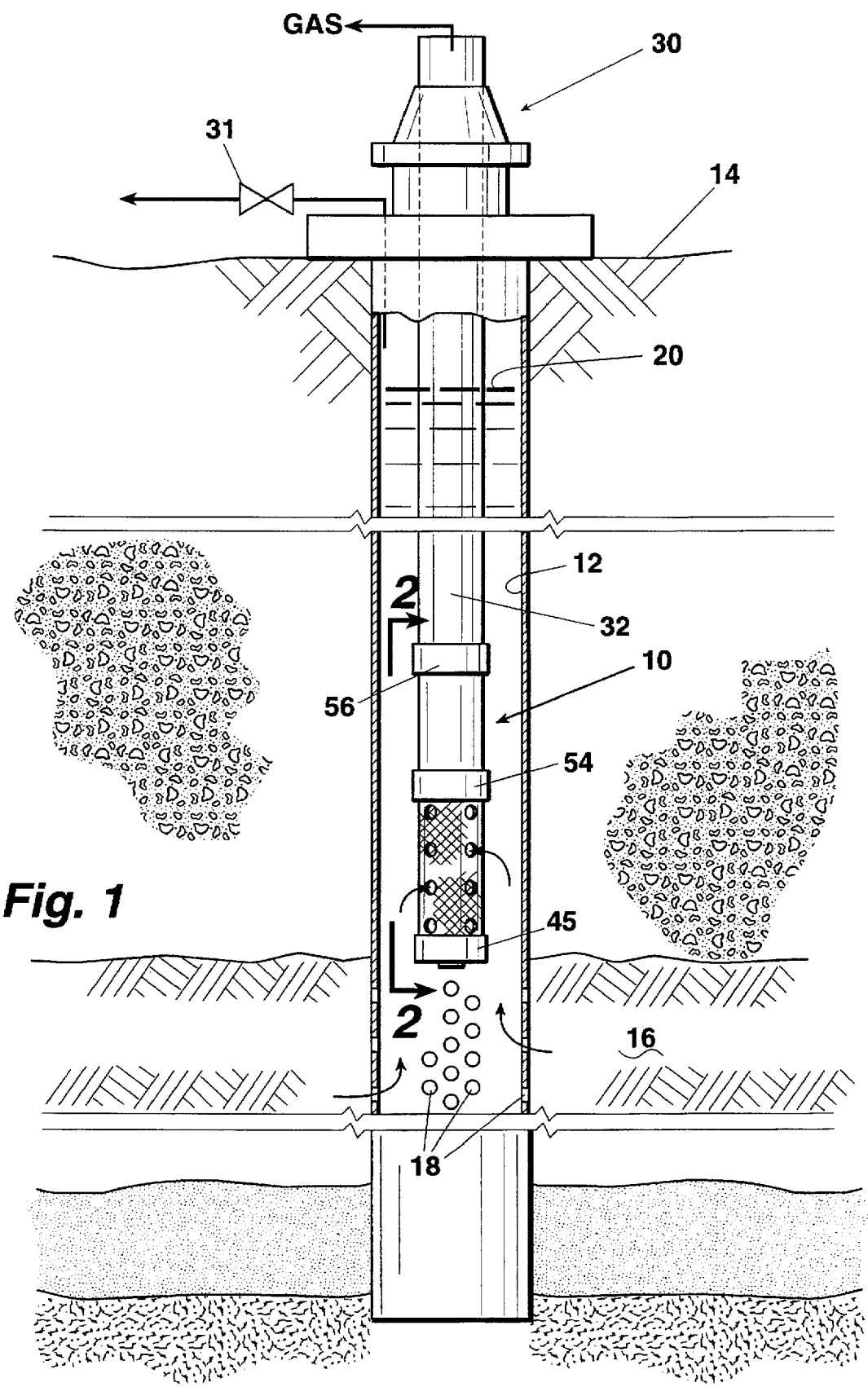
FIG. 1 is a vertical, sectional view of a well bore extending to and through a gas production zone and including the filter/separator system of this invention.

Referring to FIG. 1, the filtering apparatus of this invention is generally designated by the numeral 10 which is situated within a cased well bore 12 that extends from the ground level 14 to a hydrocarbon producing formation 16. The invention works particularly well with a formation 16 that preferably produces gas in solution with water, usually brine, via perforated openings 18 in the cased well 12. Because of the nature of the filtering apparatus 10 of this invention, there is a build up of water within the annulus of the well to a desired level 20. This level creates hydrostatic pressure within the well. The filter apparatus 10 of this invention is then positioned at an elevation A below the water level in the well substantially where the gas comes out of solution and can thus be separated by the filter, which is hereinafter described in detail. As shown in FIG. 1, a well head 30 of known design retains gas production tubing 32 with the filtering apparatus 10 attached thereto at the designated elevation. Means 31, or other pressure regulator are provided to relieve or maintain pressure within the annulus above the water level 20.

Figure 2:
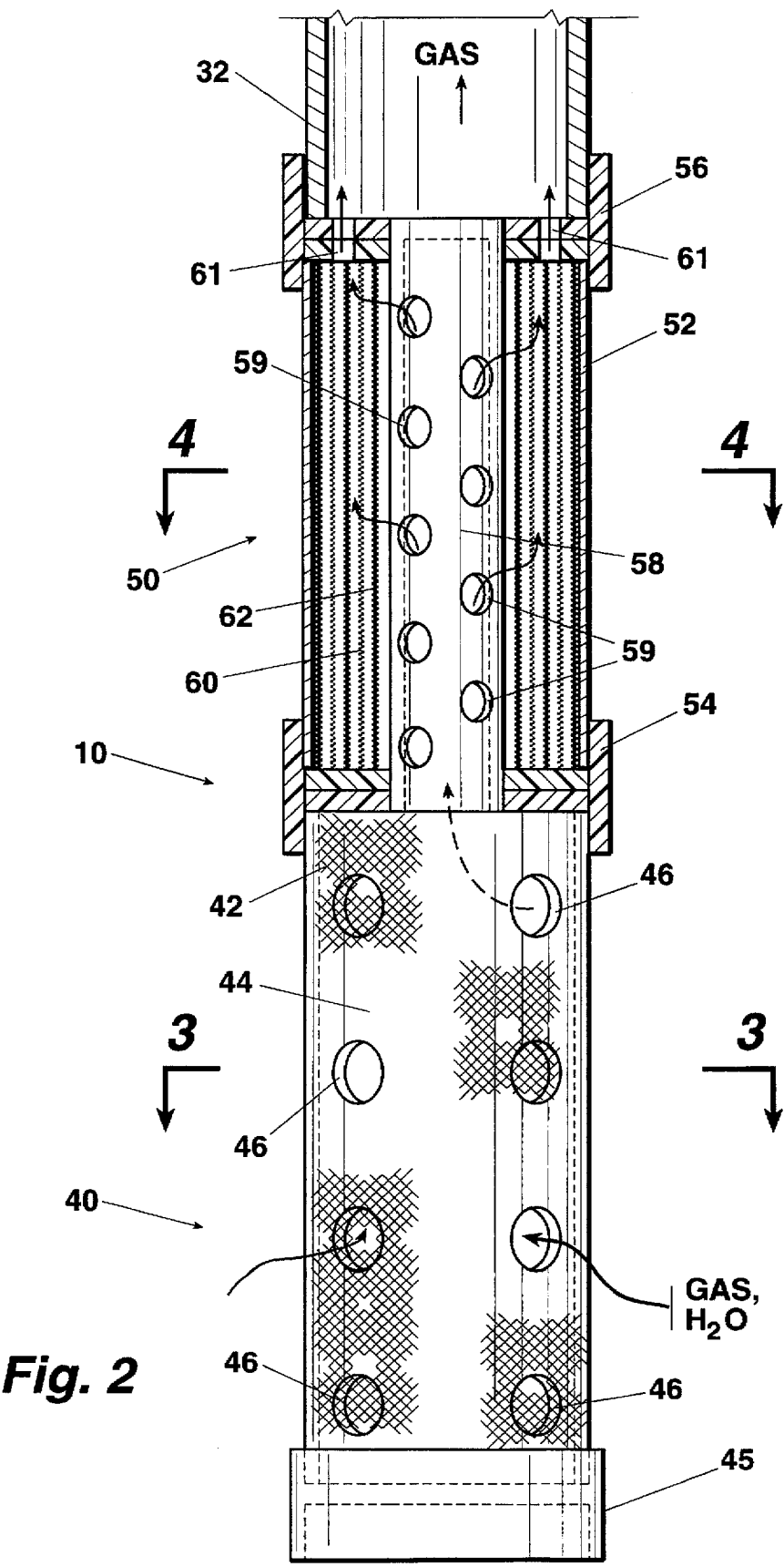
FIG. 2 is an enlarged sectional view of the prefilter and membrane separator taught in this invention.

Referring to FIG. 2, the filter of this invention is comprised of two basic portions, the outside-in flow solids filter generally designated by the numeral 40 and the inside-out gas water membrane separator 50, interconnected by the collar or fitting 54. Collar 56 interconnects the membrane filter with the production tubing 32.

Figure 4:
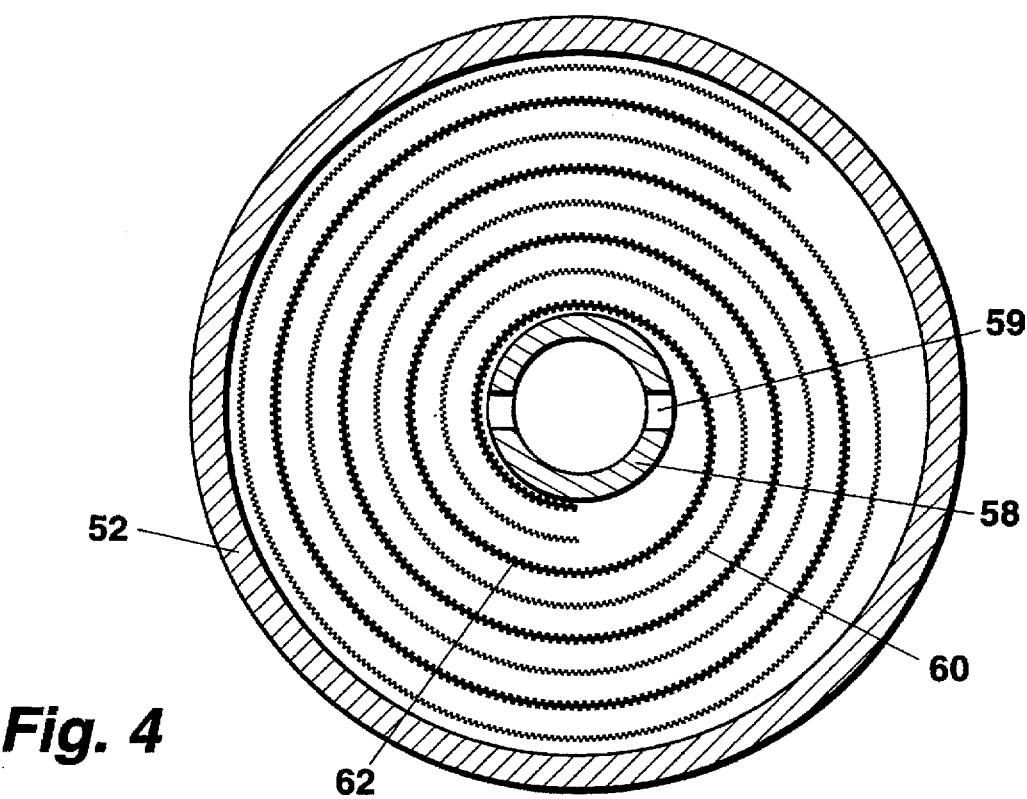
FIG. 4 is a sectional view taken along the line 4—4 of FIG. 2.
Figure 3:
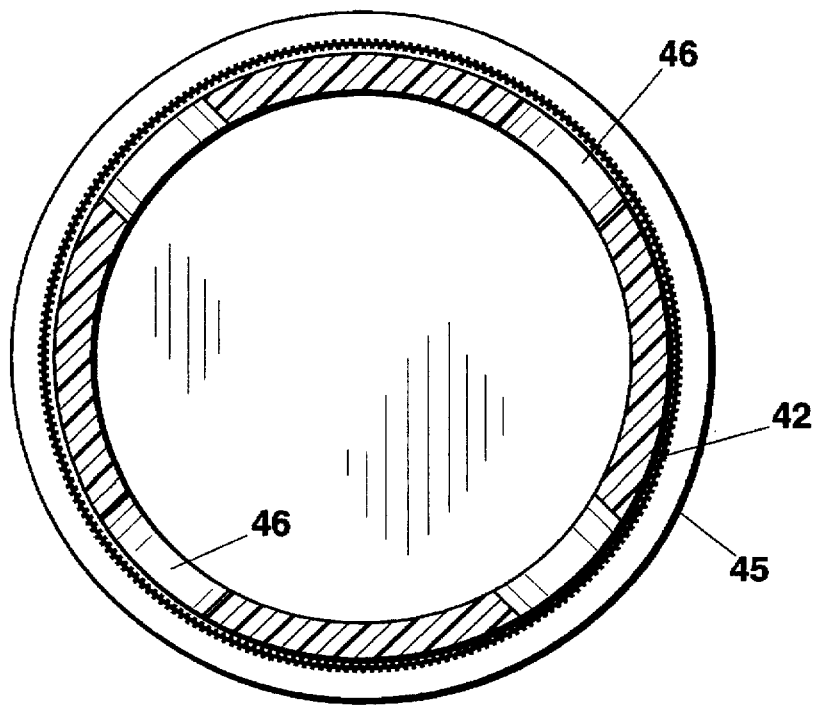
FIG. 3 is a sectional view taken along the line 3—3 of FIG. 2.

The solids filter 40 is comprised of a cylindrical member 44 having perforated openings 46 surrounded by stainless steel mesh screen 42. A bottom cap 45 closes the bottom. A top view of solids filter 40 is visible in FIG. 3. As such, gas and water enter via perforations 46 after removing solid particles, e.g., sand, formation particles and the like. The gas/water solution thus enters the membrane filter inner pipe 58 having perforations 59 to direct flow inside/outwardly across the spiral wrapped membrane 60. In the preferred embodiment, a support/backup stainless steel mesh 62, which may be coated with TEFLON® (Tetrafluro-ethylene), is spiral wrapped with the membrane as shown in FIG. 4. The membrane is of a hydrophobic material that will allow the passage of vapor/gas, but will not permit the passage of water. The separated gas then passes through passageways 61 and into the production tubing 32 to the surface for further processing.

The membrane material for use in this invention are any of those that are substantially impermeable or hydrophobic to water and particularly 'oil field' brine yet are capable of permitting the passage of gas. A preferred hydrophobic material is that which is marketed under the trademark GORTEX®. For example, a polytetrafluorethylene (PTFE) material of pore sizes between 0.3 and 0.8 microns supported on a polyolefin scrim and then physically supported by a stainless steel wire cloth of density between 400 and 100 strands per square inch, or about 100 mesh, to separate methane and associated hydrocarbon gases from formation water at rates in excess of five cubic inches per square inch per second. The supported material acts as a type of molecular sieve and is not affected by the temperatures and chemicals found in the production of hydrocarbon gases from well formations.

The microporous membrane employed in the invention comprises a microporous material, such as polymeric material containing usually a plurality of generally uniform micropores and which is suitable for use as a membrane material. Such a material includes, but is not limited to, a wide range of organic and inorganic materials. Typical of such materials which are to be included, but not limited to: an organic polymeric material, such as fluorocarbon polymers like polyfluoroethylene-type polymers, such as tetrafluroethylene (TEFLON®); or other materials which will include the properties of being sufficiently impermeable to liquids such as water yet is substantially permeable (or pervious) to gas. The membrane material for the invention is in the form of a thin, flexible sheet, the thickness of which is typically measured in mils.

The following specific example demonstrates a typical aspect of the invention. However, it is to be understood the example is for illustrative purposes only and do not purport to be wholly definitive as to the conditions and scope, since each gas well generally represents a variety of different depths, conditions and characteristics.

The test well is the Scudder-Lilly #15. The original well was drilled by cable tools in 1955. It was plugged in 1972 and reopened in 1978, cleaned out to the bottom of the shot holes, then acidized and fractured. Casing in this well is 5½ inch diameter.

The Bartlesville sand in this well goes from 1135 to 1156 feet deep. The well was deepened in 1990. Circulation was lost, and the well was deepened to 1346 feet deep.

This well was selected for an initial test because it was completely filled with water and the water was strongly agitated by the presence of methane bubbles. The well was cleaned out. The experimental tool was attached to 2" tubing and lowered into the well. The tool was built from 2½ i.d. PVC tubing as an exterior shell. As it was being lowered, gas could be detected coming through the top of the tubing, indicating that gas was going through the membrane of the tool being lowered into the well.

The tool was set at 1162.95 feet, 183 feet above the bottom of the well. Gauges were set to measure annulus pressure and production tubing pressure on the downstream side of the membrane and steel mesh filter. It was observed that gas flow through tool and tubing began soon after encountering (well) fluid at about 500 feet, continued to monitor . . . at 750 still making gas . . . at 1035 still showing detectable gas flow. The annulus was closed and a strong pressure buildup was observed in the annulus but no observable change in flowing tubing pressure. Started flow into 300 gallon volume pressure tank scrubber and observed pressure build-up from tubing. It then started pulling vacuum on delivery line—machine indicated 10 points of vacuum when electricity failed.

It was estimated that the well production would be in excess of 30,000 cubic feet of gas per day. The well was shut in and the tubing and tool pulled. It was evident that there was no water in the tubing and that separation of the gas from well water fluid occurred at a high rate has taken place.

Because of the distinctions that may exist from one gas well to the next even though they maybe offset from each other, these dictate that the location of the prefilter and the membrane filter of this invention be located at an elevation substantially wherein the gas will bubble out of solution.

One skilled in the art can readily calculate where to set the tool initially to obtain an environment that has 200 pounds of hydrostatic water pressure above the tool in excess of the total gas plus formation pressure in pounds per square inch.

For example, if the formation pressure is 400 psi, the prefilter and membrane filter of this invention will be set at a depth where there is 600 psi of hydrostatic pressure over the tool. In some instances, however, it may be necessary to raise or lower the tool for optimum production.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method of recovering gas from a subterranean well formation producing liquid with gas in solution comprising the steps of:

positioning a length of gas production tubing in said well creating an annulus, said tubing having filter at its bottom end, said filter having a membrane that is liquidphobic yet will allow gas to pass therethrough, allowing said liquid to fill said annulus to a given height, positioning said tubing such that a depth of said filter below said height of liquid is substantially adjacent a point where said gas comes out of solution.

2. The method of claim 1 wherein said liquid is water or brine and said membrane is hydrophobic.

3. The method of claim 1 including a relieving or maintaining step of a pressure above said liquid in said annulus to maintain said filter position point of gas coming out of solution.

4. The method of claim 2 including a relieving or maintaining step of a pressure above said liquid in said annulus to maintain said filter position point of gas coming out of solution.

5. The method of claim 1, wherein said depth of said filter is positioned in an environment that has 200 pounds hydrostatic water pressure above said filter in excess of a total gas plus formation pressure.

6. The method of claim 2, wherein said depth of said filter is positioned in an environment that has 200 pounds hydrostatic water pressure above said filter in excess of a total gas plus formation pressure.

7. The method of claim 3, wherein said depth of said filter is positioned in an environment that has 200 pounds hydrostatic water pressure above said filter in excess of a total gas plus formation pressure.

8. Apparatus for separating gas from water in a production well comprising:
   a well situated so as to be in communication with a producing subterranean gas/water formation;
   gas production tubing suspended in said well a lower end of which includes,
   a first outside to inside flow lower prefilter for separating solids from said gas/water well fluid,
   a second inside to outside flow upper filter to receive gas/water from said first filter, said second filter having an annular space in communication with said production tubing, said annular space filled with a spiral wrapped combination of a fine mesh screen and a membrane, said membrane capable of preventing passage of water but allow the passage of gas.

9. Apparatus for separating gas from water in a production well comprising:
   a well situated so as to be in communication with a producing subterranean gas/water formation;
   gas production tubing suspended in said well a lower end of which includes,
   a filter to receive said gas/water, said filter having a membrane capable of preventing passage of water but allow the passage of gas, positioned between the interior of said production tubing and said gas/water;
   means to maintain a given level of water in said well; and
   means to position said filter at a depth below said level of water wherein said gas will bubble out of solution.

10. Apparatus of claim 9 including a solids prefilter connected to said membrane filter.

11. The apparatus of claim 9 wherein said membrane filter includes a fine mesh screen for support of said membrane filter.

12. A gas filter for separating gas from a subterranean gas/liquid production well comprising:
   production tubing situated in said well,
   said filter connected to the end of said tubing and comprised of a spiral coil of filter material positioned between said produced gas/liquid and said tubing, said filter material comprised of a fine mesh screen and a membrane, said membrane being hydrophobic, but yet capable of allowing gas to flow therethrough to said production tubing.

* * * * *